(12) United States Patent
Fleenor et al.

(10) Patent No.: US 7,987,605 B2
(45) Date of Patent: Aug. 2, 2011

(54) REFLECTOR TARGET TRIPOD FOR SURVEY SYSTEM WITH LIGHT EMITTER AND PIVOTING BRACKET FOR ENHANCED GROUND MARKING ACCURACY

(76) Inventors: Roger Fleenor, Waikoloa, HI (US); Richard John Fleenor, Bardstown, KY (US)

( * ) Notice: Subject to any disclaimer, the term of this patent is extended or adjusted under 35 U.S.C. 154(b) by 0 days.

(21) Appl. No.: 12/710,496

(22) Filed: Feb. 23, 2010

(65) Prior Publication Data
US 2010/0212169 A1    Aug. 26, 2010

Related U.S. Application Data

(60) Provisional application No. 61/154,668, filed on Feb. 23, 2009.

(51) Int. Cl.
*G01C 15/08*    (2006.01)
(52) U.S. Cl. ......................................................... 33/293
(58) Field of Classification Search ...................... 33/293
See application file for complete search history.

(56) References Cited

U.S. PATENT DOCUMENTS

| | | | | |
|---|---|---|---|---|
| 3,181,242 A | * | 5/1965 | Cook | 33/464 |
| 3,736,058 A | * | 5/1973 | Iadarola | 356/4.08 |
| 4,290,207 A | * | 9/1981 | Browning et al. | 33/295 |
| 4,339,880 A | * | 7/1982 | Hall | 33/293 |
| 4,490,919 A | * | 1/1985 | Feist et al. | 33/290 |
| 4,787,290 A | * | 11/1988 | Argon | 89/37.05 |
| 5,701,679 A | * | 12/1997 | Buzikievich | 33/293 |
| 6,657,734 B1 | * | 12/2003 | Monz et al. | 356/601 |
| 7,611,105 B1 | * | 11/2009 | Carazo | 248/187.1 |
| 2002/0162233 A1 | * | 11/2002 | El-Katcha et al. | 33/293 |
| 2008/0229592 A1 | * | 9/2008 | Hinderling et al. | 33/293 |

* cited by examiner

*Primary Examiner* — Christopher W Fulton
(74) *Attorney, Agent, or Firm* — Miller, Matthias & Hull LLP

(57) ABSTRACT

A combination target reflector, light emitter and bracket assembly is disclosed for use in marking points during the taking of a land survey. The combination is pivotally connected to a central rod of a target tripod or a tripod that supports a target reflector. The disclosed combination includes first and second arms and a light emitter that is held in axial alignment with the target reflector. The first arm is pivotally and perpendicularly connected to the central rod of the tripod. The second arm is perpendicularly connected to the target reflector and the light emitter. The tripod can be moved close to a point to be marked, the tripod can be adjusted to plumb the target reflector and then the second arms, light emitter and target reflector can be moved out of axial alignment with the rod to mark the point without moving the tripod. As a result, the conventional trial and error procedure currently employed can be avoided.

19 Claims, 10 Drawing Sheets

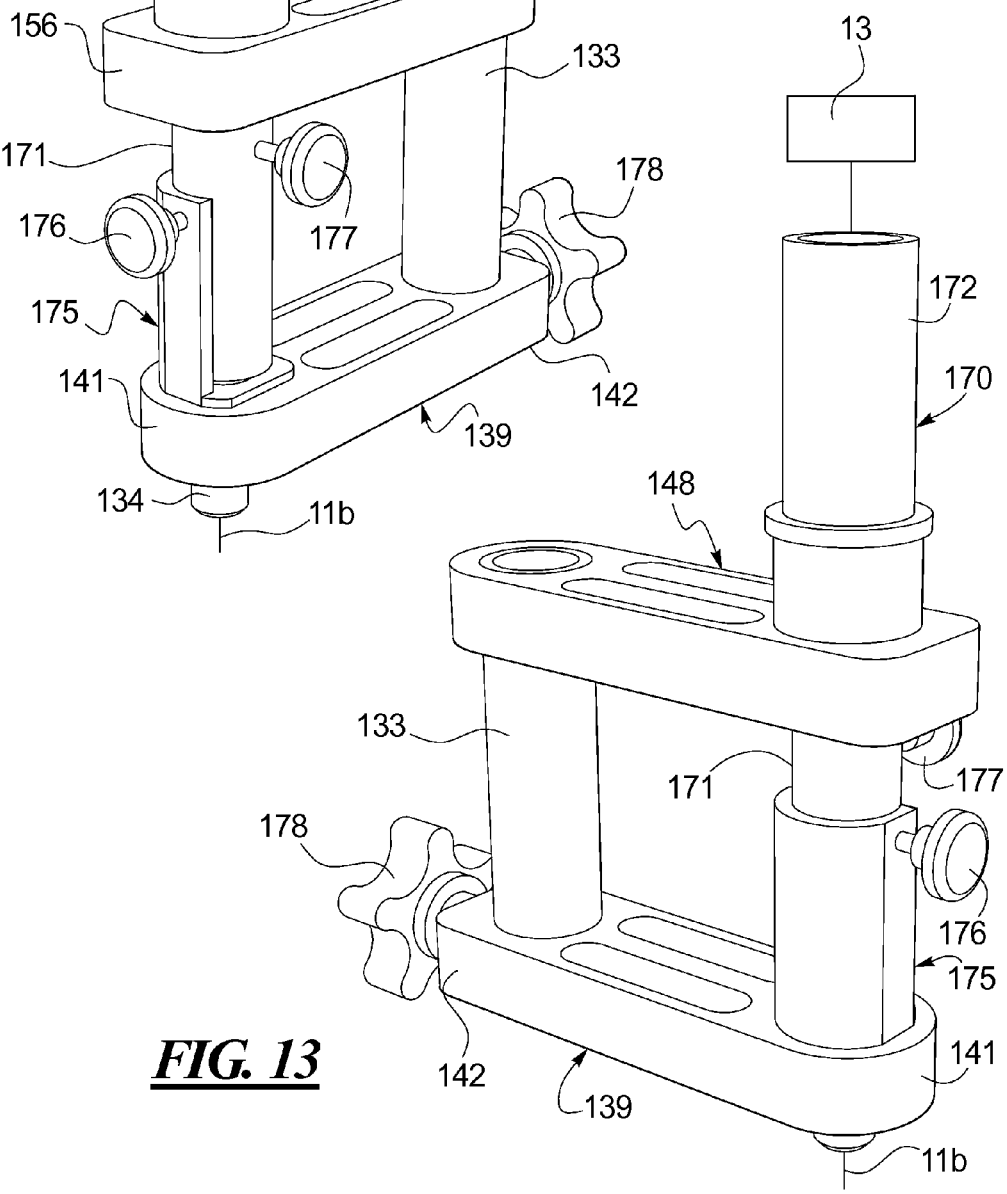

REFLECTOR TARGET TRIPOD FOR SURVEY SYSTEM WITH LIGHT EMITTER AND PIVOTING BRACKET FOR ENHANCED GROUND MARKING ACCURACY

CROSS-REFERENCE TO RELATED APPLICATION

The present application claims the benefit of U.S. Provisional Application No. 61/154,668 filed on Feb. 23, 2009.

TECHNICAL FIELD

This disclosure relates generally to survey instruments and systems and methods for conducting land surveys. More specifically, this disclosure relates to an improved reflector or target tripod with a light emitter mounted on a pivoting target/reflector bracket for facilitating and enhancing the accuracy of ground marking during the process of taking a land survey.

BACKGROUND

Land is surveyed to create a contour map or other graphical representation of the land based on linear and angular measurements. According to conventional practice, surveying is at least a two person job, with one person operating a measuring instrument, transit or total station from a generally stationary position and the other person transporting and positioning a rod or target that is sighted by the measuring instrument. To create a graded surface from a track of land, the land is marked or staked.

Relatively crude instruments were once used for land surveying. Surveyors used simple optical theodolites as transits to determine the horizontal azimuth angles and the vertical elevation angles between survey points. Chains and tape measures were used to measure the distance between the theodolite and a point to be established. Telescopic devices, e.g., horizontal levels and graduated rods were also used to determine the actual elevation of a point or location from a reference position.

Referring to FIG. 1, the transit 10, also known as the measuring instrument or station, is positioned at a known distance and angle from a reference or bench mark position. The target 11, also referred to as the "rod," is positioned at a location where it is leveled by the operator to ensure accurate measurements. As shown in FIG. 2, the target 11a may be placed upon a tripod 12 which includes a bubble measure (not shown) to ensure that the tripod 12 is level. At each such location, the distance and angle of the target 11a with respect to the position of the transit 10 is determined and recorded. Distances were traditionally measured manually with a steel tape or chain.

In contrast, modern transits may incorporate electronic distance measurement (EDM) technology in the form of laser and/or infrared beams in combination with retro-reflective devices, such as corner cube prisms, in the determination of precise distances. In addition to or as an alternative to EDM, modern transits can incorporate global positioning satellite (GPS) technology. FIG. 3 schematically illustrates a modern transit station 10a that may be linked optically to the target reflector 13 as well as being communicatively linked to a GPS 14 and a receiver 15 mounted to a tripod 12a. The transit 10a also includes a receiver 19. The target receiver 15 typically includes a display 16 and/or a speaker 17, both of which can provide an indication to the rod operator that the target 13 and rod 11b are disposed in the correct location for marking. It will be noted that the target 13 is mounted directly above the rod 11b. The reflector 13 may also include some sort of transmitter for communicating with the GPS system 14 and/or the transit 10a. The target receiver 15 may also be optically or otherwise communicatively linked to the target 13, GPS system 14 and the transit 10a. The beams originating at the transit 10a are reflected by the target/reflector 13 as parallel collinear beams of energy back to the transit receiver 19. Phase angle measurements and timing circuits allow the exact distance between the transit 10a and reflector 13 to be precisely determined and displayed. Such electronic instruments have greatly improved the accuracy of the measurements and the setting of points. EDM devices can be used to provide accurate measurements even though the reflector or prism targets 13 are two or three thousand feet away from the transit 10a.

Still referring to FIG. 3, to mark a point, the target 13 is positioned near a location to be marked, and its position is determined by the transit 10a. If the target 13 is not exactly positioned at the location to be marked, the position is noted and the target 13 is repositioned and re-measured until the measuring transit 10a and/or target receiver 15 verifies that the tripod 12a is positioned at the precise location to be marked. A stake 21 or other marker is then driven into the ground at that point. However, as explained below, the process of accurately placing the stake 21 into the ground 22 as the desired point is problematic.

Specifically, once the operator has placed the target 13 and rod 11b in the correct location, the operator then sets the legs 18 into position and manipulates the tripod 12a until the rod 11b and target reflector 13 are plum or vertical. Typically, the tripod 12a may be equipped with a plumb bob or level (not shown). The receiver 15 communicating with the transit 10a may also communicate to the operator that the rod 11b and target 13 are plum or vertical. At this point, with the rod 11b and target 13 in a plumb or vertical position and after being assured by the transit 10a or target receiver 15 that the rod 11b and target 13 are in the correct location, the operator must then move the rod 11b to place a stake 21 in the ground 22 in the exact location from which the rod 11b has just been moved. To do this, the skilled operator will move the rod 11b, keep his or her eye on the spot on the ground 22 where the stake 21 should be placed, insert the state 21 into the ground, and then replace the rod 11b and tripod 12a back into the position to confirm that the stake 21 is in the correct position. Often, the operator does not place the stake 21 in the exact desired location and the stake 21 must be moved, and the process repeated until the correct location of the stake 21 is verified. This trial and error process is typically repeated a number of times before the accuracy of the placement of the stake 21 are confirmed.

Referring to FIG. 4, the use of a rod 11c and target 13 without a tripod is even more difficult. Target rods 11c without tripods typically may include a sharp distal end 23 that puts a preliminary visual mark on the ground 22. However, the preliminary mark may be difficult to see if the ground surface is rough, wet, grassy, etc. Further, ensuring that the rod 11c is plum or vertical can be time-consuming unless the operator is skilled or experienced. Typically, placing the stake 21 in the correct location also requires the same trial and error process described above in connection with FIG. 3.

Thus, even with the advent of EDM, GPS, electronic transits 10a, electronic target receivers 15 and target reflectors 13, one prominent problem associated with currently available targets 13 mounted on either rods 11c or tripods 12a lies in the trial and error process used by operators to accurately place the mark 21 into the ground. Obviously, the above procedure is cumbersome, repetitive and time consuming. These problems are exacerbated when dozens or hundreds of marks must be placed for larger tracts. As a result, there is a need for methods and apparatuses for more rapid and accurate marking of surveyed land.

SUMMARY OF THE DISCLOSURE

In satisfaction of the aforenoted needs, a combination target reflector, light emitter and bracket assembly for pivotal connections to a central rod of a tripod. The disclosed combination, illustrated in FIGS. 12-16, includes a first arm, a second arm and a light emitter. The first arm is pivotally and perpendicularly coupled to the central rod. The first arm is also pivotally coupled to the second arm so the first and second arms are parallel with each other. The second arm is coupled to the light emitter so that the light emitter is parallel to the central rod.

In a refinement, the second arm is pivotally coupled to the first arm.

In another refinement, the first arm and the second arm each include proximal and distal ends. The proximal end of the first arm is pivotally and perpendicularly coupled to the central rod. The distal end of the first arm is pivotally coupled to the proximal end of the second arm by a shaft. The distal end of the second arm is coupled to the light emitter.

In another refinement, the distal end of the second arm is perpendicularly coupled to the target reflector so the target reflector is an axial alignment with the light emitter.

In another refinement, the light emitter and target reflector are coupled together and to the second arm by an adapter. In a further refinement of this concept, the adapter comprises a first tubular section for accommodating the light emitter and a second tubular section for accommodating a shaft that is coupled to the target reflector. In still a further refinement of this concept, the proximal end of the first arm is coupled to a home clamp. The home clamp comprises a recess for receiving the light emitter and first tubular section of the adapter when the combination is moved to a home position with the distal end of the second arm in alignment with the proximal end of the first arm.

In another refinement, the first arm is coupled to the central rod by a bearing shaft with an annular disk disposed between the first arm and the central rod.

In another refinement, the distal end of the first arm is threadably coupled to a clamp member that engages the shaft that couples the first and second arms together to hold the first and second arms in a fixed relationship with respect to each other. In this refinement, the second arm is preferably fixedly coupled to or connected to the shaft.

In another refinement, the second arm can be pivoted away from the central rod so that the light emitter can admit a light beam through the first tubular section of the adapter to the ground where the light beam is an axial alignment with the target reflector.

In another refinement, a method of marking a point of a land survey is disclosed which comprises providing a tripod coupled to the combination described above, moving the tripod close to the point to be marked, adjusting the tripod until the central rod and target reflector are plumb, pivoting the second arm so that the light emitter and the target reflector are not an axial alignment with the central rod and so that the target reflector and light emitter are positioned in axial alignment with the point to be marked, emitting a light beam from the light emitter downward to the point, and marking the point.

Yet another disclosed combination includes a target reflector, electronic plum bob and bracket assembly as disclosed in FIGS. 5-11. The combination is pivotally connected to a central rod of a target tripod or a tripod that supports a target reflector. The disclosed combination includes an arm, a bracket, and a plumb bob that includes a light emitter. The arm is pivotally and perpendicularly connected to the central rod of the tripod. The bracket includes lower and upper walls that are parallel to each other and the arm. The upper and lower walls are also perpendicular to the central rod. The arm is pivotally connected to the bracket. The upper wall of the bracket is perpendicularly connected to the target reflector. The lower wall of the bracket supports the plum bob and includes an open area that is in axial alignment with the light emitter and the target reflector. The tripod can be moved close to a point to be marked and can then be adjusted to plumb the target reflector. Then, the bracket, plum bob and target reflector can be moved out of axial alignment with the central rod to mark the point without moving the tripod. As a result, the prior art trial and error procedure currently employed can be avoided.

In a refinement, the bracket includes a c-shaped profile with a vertical rear wall connecting the parallel lower and upper walls.

In a refinement, the arm and lower wall of the bracket each include proximal and distal ends. The proximal end of the arm is pivotally and perpendicularly connected to the central rod. The distal end of the arm is pivotally connected to the proximal end of the lower wall of the bracket. In a further refinement, the open area of the lower wall of the bracket is disposed at the distal end of the lower wall of the bracket.

In a refinement, the upper wall of the bracket includes proximal and distal ends. The distal end of the upper wall is perpendicularly connected to the target reflector at a point in axial alignment with the open area of the lower wall of the bracket.

In a refinement, the open area of the lower wall of the bracket is a hole. In a related refinement, the upper wall of the bracket also includes a hole, through which the target reflector is connected. The holes of the upper and lower walls of the bracket are in axial alignment with each other. Thus, the target reflector is in axial alignment with the light emitter of the plumb bob, which is used to mark the point without moving the tripod.

In a refinement, the target reflector comprises a shaft that is perpendicularly connected to the upper wall of the bracket. Thus, if the target reflector is mounted on a shaft, the target reflector, shaft and open area in the lower wall of the bracket are in axial alignment with the plumb bob, which is used to mark the point without moving the tripod.

In a refinement, the arm is connected to the central rod by a hinge mechanism that includes a grommet with a washer disposed between the arm and central rod.

In a refinement, the arm is connected to the lower wall of the bracket by a hinge mechanism that includes a grommet with a washer disposed between the arm and lower wall of the bracket.

Using the above combination, the bracket can be pivoted away from the central rod of the tripod so that the light emitter can emit a beam through the open area of the lower wall of the bracket to the ground that is in axial alignment with the target reflector. As a result, the tripod does not need to be moved to mark the point and the trial and error procedure of the prior art is avoided.

A method of marking a point of a land survey is also disclosed. The disclosed method includes: providing a tripod connected to the combination as described above; moving the tripod close to the point; adjusting the tripod until the central rod and target reflector are plumb; pivoting the bracket so that the open area of the lower arm, the light emitter and the target reflector are not in axial alignment with the central rod and so that target reflector and light emitter are positioned in axial alignment with the point; emitting a light beam from the light emitter downward to the point; and, without moving the tripod, marking the point using the engagement of the light beam on the ground as an indicator of the precise and accurate location of the point.

BRIEF DESCRIPTION OF THE DRAWINGS

FIGS. 12-16 are detailed views of another disclosed bracket and light emitter assembly.

DETAILED DESCRIPTION

Figure 1:
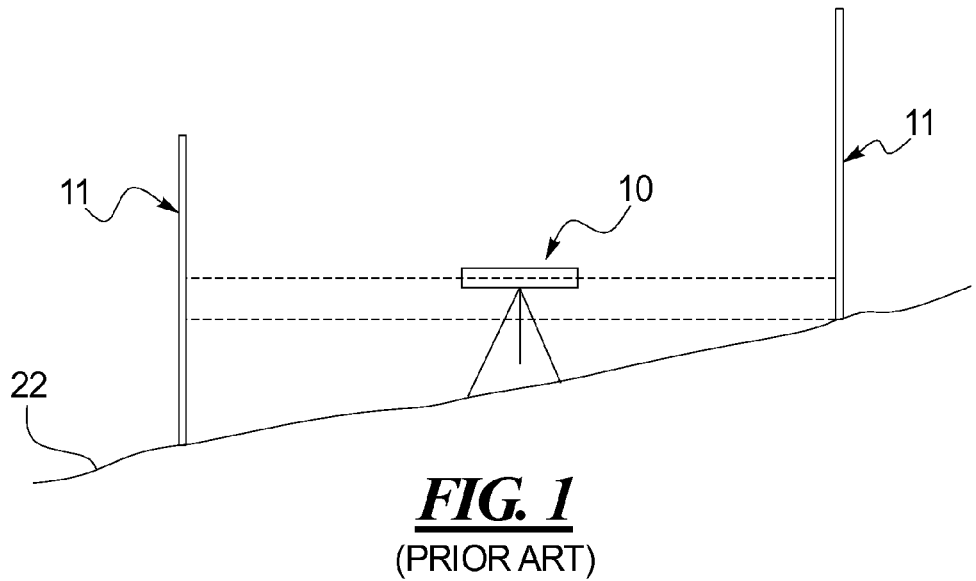
FIG. 1 schematically illustrates prior art transit and two target rod.
Figure 2:
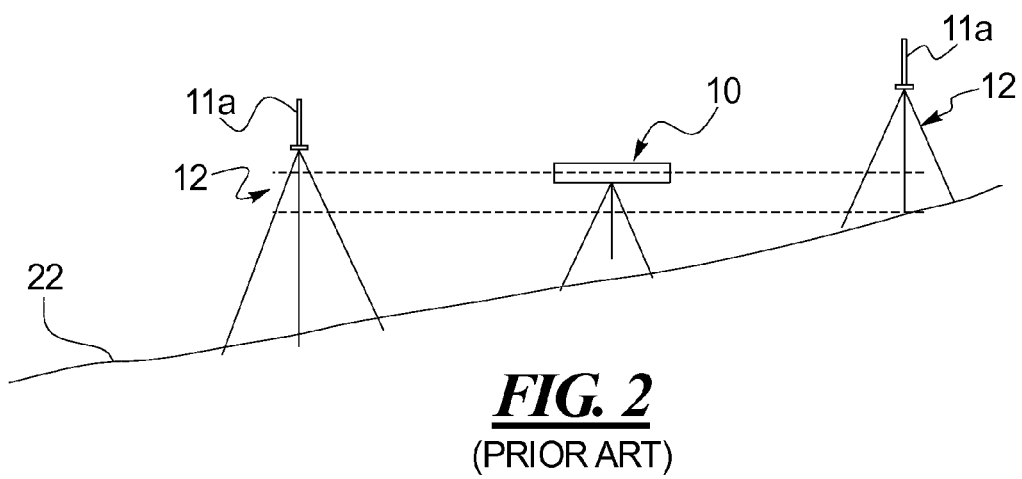
FIG. 2 schematically illustrates a prior art transit and two prior art target tripods.
Figure 3:
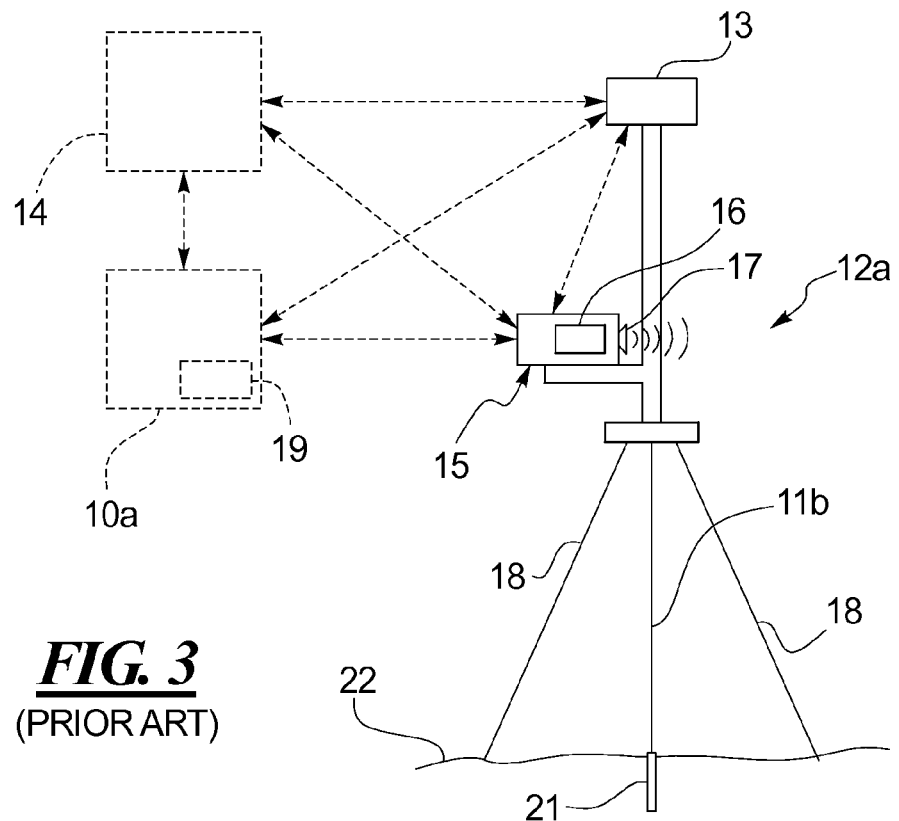
FIG. 3 schematically illustrates a prior art target tripod for use in connection with an electronic surveying system.
Figure 4:
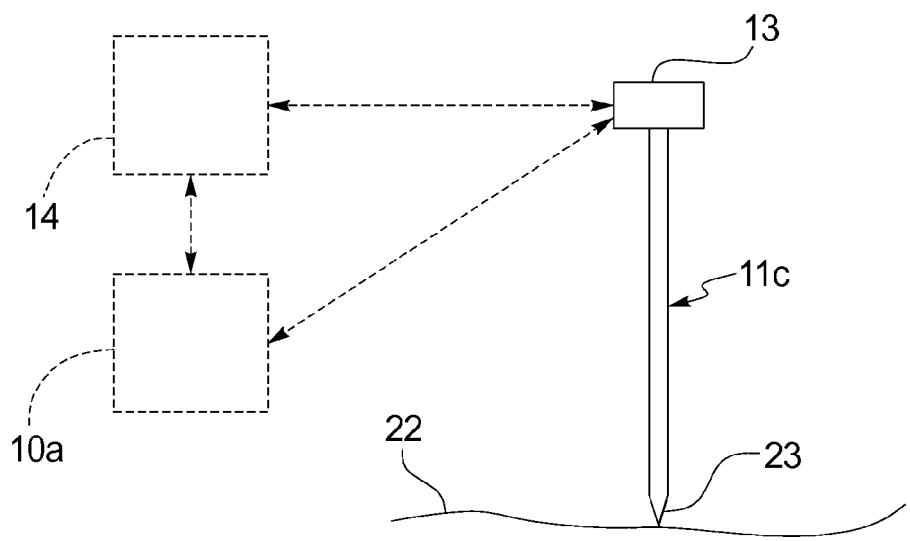
FIG. 4 schematically illustrates a target rod with a reflector for use with an electronic surveying system.
Figure 5:
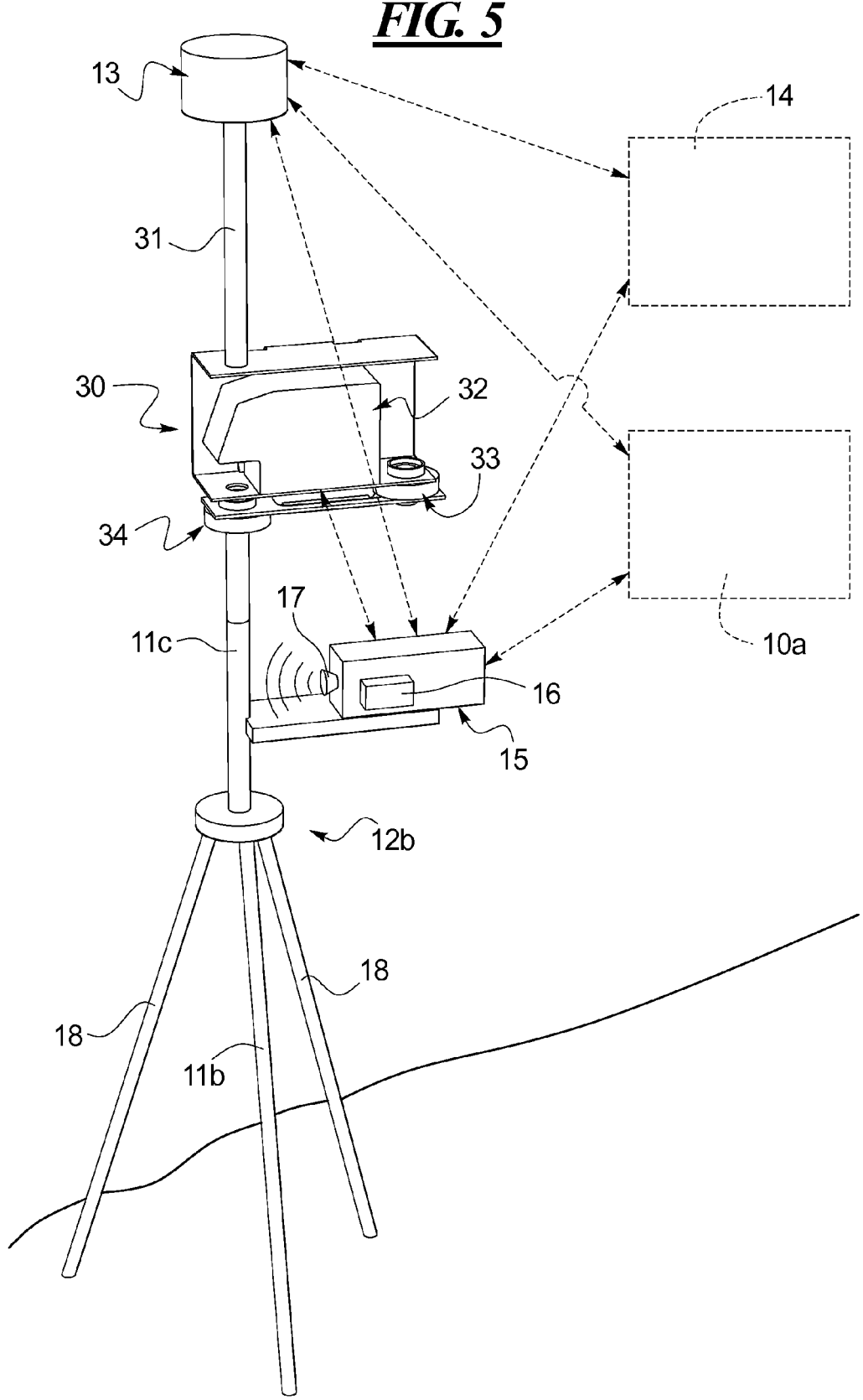
FIG. 5 illustrates a target tripod modified with the combination bracket assembly, electronic plumb bob and target reflector made in accordance with this disclosure.

Referring to FIG. 5, an improved target tripod 12b is illustrated with three legs including a center leg 11b and two additional stabilizing legs 18, similar to the tripod 12a illustrated in FIG. 3. The center leg 11b is axially aligned with a center rod 11c that supports a receiver 15 and the disclosed bracket assembly 30 which will be described in greater detail in connection with FIGS. 7-11. The bracket assembly 30 supports a target reflector 13 that will typically be mounted on the end of a shaft 31. The bracket assembly 30 also supports an electronic plumb bob 32, such as one of the $PLS^3$ or $PLS^5$ plumb bobs available from Pacific Laser Systems of San Rafael, Calif. (http://www.plslaser.com/). Other electronic plumb bobs or leveling tools will be apparent to those skilled in the art. Tripods, transits and total stations are available from a wide variety of manufacturers and suppliers, too numerous to mention here. The target receiver 15 maybe in communication with a transit 10a, a GPS system 14, the target reflector 13 and, optionally, the plumb bob 32.

Figure 6:
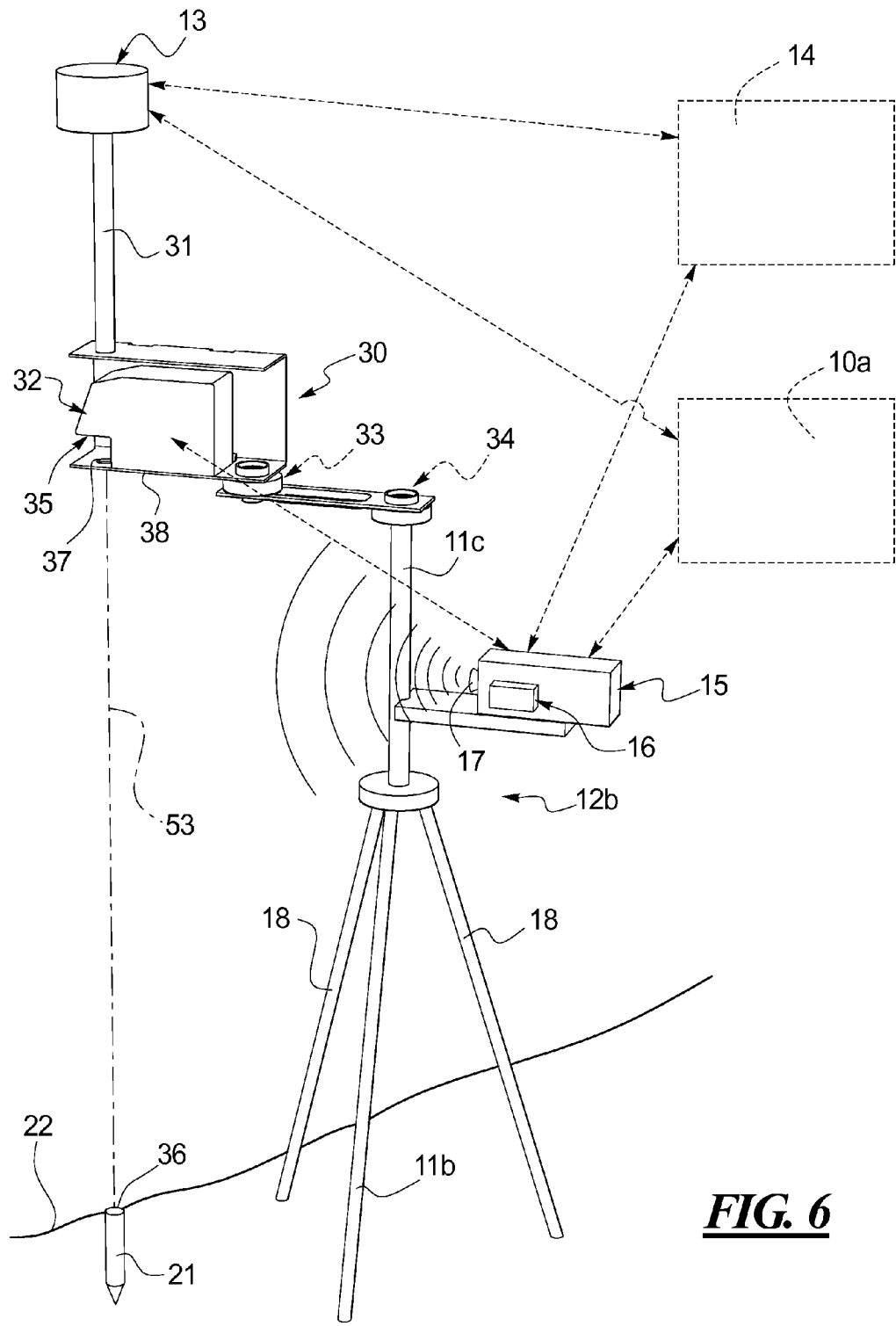
FIG. 6 illustrates a modified tripod shown in FIG. 5 with the bracket assembly positioned for marking a point.

FIG. 6 illustrates the advantages of using the tripod 12b modified with the disclosed bracket assembly 30. Referring back to FIG. 5, it will be noted that the prior art technique for marking a point would normally include placing the tripod 12b as close to the point to be marked as possible. Using cues from the transit 10a or the target receiver 15, the operator places the center leg 11b over the point, plumbs the center leg 11b and target reflector 13 using a conventional plumb bob or level (not shown), confirms with the operator at the transit 10a that the target reflector 13 is in the correct position, moves the tripod 12b and center leg 11b while keeping eye contact on the exact spot where the center leg 11b was, attempts to mark that exact spot, replaces the tripod 12b and center leg 11b over the marked spot, and determines from the operator at the transit 10a or from information generated by the target receiver 15 whether the mark is accurate. In most circumstances, the mark is slightly inaccurate and the entire process must be repeated one or more additional times.

In contrast, referring to FIG. 6, the target tripod 12b is moved to within a close proximity of the point 36 on the ground 22 to be marked but not directly over the point 36. Then, with confirmation that the point 36 to be marked is within a radial area of the central rod 11c that can be reached by the bracket assembly 30 (see the distance R in FIG. 10), the legs 11b, 18 of the tripod 12b are set and the tripod 12b can be plumbed or oriented vertically using the plumb bob 32. Then, using cues from the transit 10a or target receiver 15, the bracket assembly 30 is pivoted outward from the central rod 11c and, using the dual hinges 33, 34, the coaxially-aligned shaft 31, target reflector 13, and plumb bob light emitter 35 are positioned over the point 36 on the ground 22 to be marked. Light, in the form of laser light or infrared light is emitted downward from the light emitter 35 of the plumb bob 32 through the opening 37 in the lower wall 38 of the bracket assembly 30 to the point 36 on the ground 22.

Without moving the tripod 12b, the operator can use both hands to accurately mark the point 36 with a stake 21 by simply looking on the ground 22 for the light emitted by the emitter 35 of the plumb bob 32. Hence, once the point 36 on the ground 22 is found, and the bracket assembly 30 is oriented so that the emitter 35 hits the point 36 with a light ray, the operator can then drive the stake 21 into the ground 22 at the point 36 without touching or moving the tripod 12b. Hence, in most cases, the stake 21 will be driven into the ground 22 correctly in the first instance and the time consuming trial and error procedure of the prior art is avoided.

The disclosed bracket assembly 30 is illustrated in greater detail in FIGS. 7-11. The arm 39 includes a proximal end 41 and a distal end 42. The proximal and 41 of the arm 39 is pivotally and perpendicularly connected to the central rod 11c by way of the hinge connection 34 that includes a pintle 43, washer 44, retainer 45 and grommet 46. Other means for pivotally and perpendicularly attaching the arm 39 to the central rod 11 c will be apparent to those skilled in the art and the pintle 43/washer 44/retainer 45/grommet 46 connection means is but one possible design. The primary criteria for the connection between the arm 39 and the central rod 11c is a perpendicular and pivotal connection that will support the cantilever forces imposed on hinge connection 34 by the remaining elements of the bracket assembly 30, namely the c-shaped bracket member 48, the electronic plumb bob 32, the target reflector shaft 31, the target reflector 13 and the related connection elements.

The distal end 42 of the arm 39 is similarly pivotally connected to the proximal end 51 of the lower wall 38 by the hinge connection 33 that also includes a pintle 43, washer 44, retainer 45 and grommet 46. The hinge connection 33 supports the lower wall 38 and entire c-shaped bracket member 48 above the arm 39 in a parallel fashion. Because the arm 39 is connected in a perpendicular fashion to the central rod 11c and because the lower wall 38 of the c-shaped bracket member 48 is maintained in a parallel relationship to the arm 39, the lower wall 38 and the upper wall 52 of the c-shaped bracket member 48 are maintained in a perpendicular relationship to the central rod 11c.

The lower wall 38 of the c-shaped bracket member 48 supports the plumb bob 32 in a perpendicular relationship to the central rod 11c so that the light emitter 35 of the plumb bob 32 is disposed coaxially with the central rod 11c and the shaft 31 that supports the target reflector 13 when the bracket assembly is in the closed position shown in FIG. 5. However, because of the dual hinges 33, 34, the light emitter 35, shaft 31 and target reflector 13 can be moved to a variety of radially offset but parallel positions to the central rod 11c.

Figure 7:
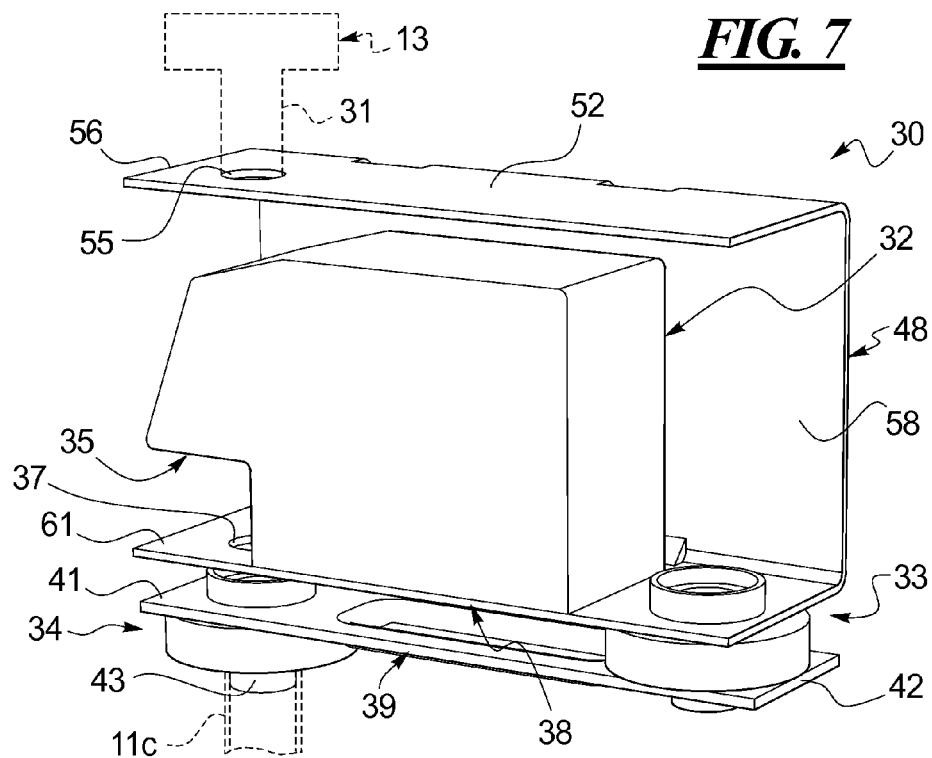
FIGS. 7-11 are detailed views of the bracket assembly illustrated in FIGS. 5-6.
Figure 8:
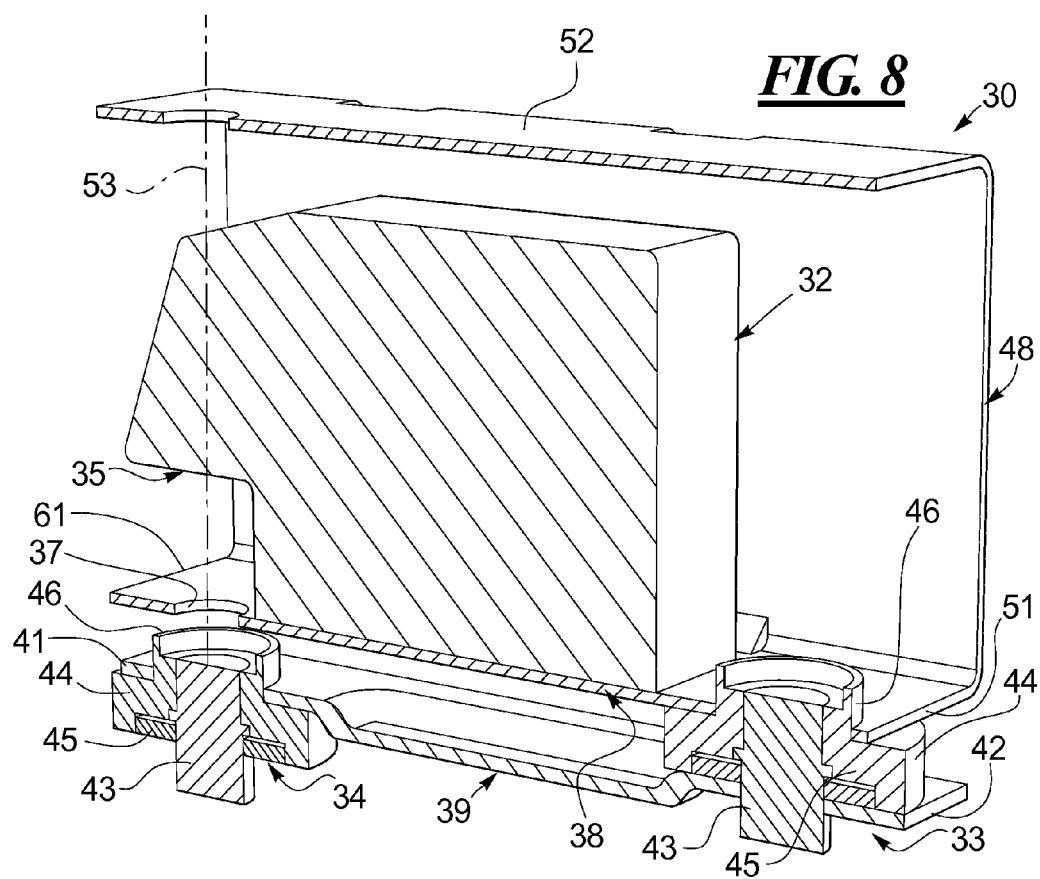

Specifically, referring to FIGS. 7 and 8, the light emitter 35, shaft 31 and target reflector 13 are all disposed along the axis shown in phantom at 53. In the closed position of FIG. 5, the axis 53 is also coaxial with the central rod 11c. However, to mark a point 36 on the ground 22, the bracket assembly 30 is manipulated so that the axis 53 is not coaxial with the rod 11c but offset from the rod 11c so that light from the light emitter 35 can be directed toward the ground 22 to mark the point 36.

Figure 9:
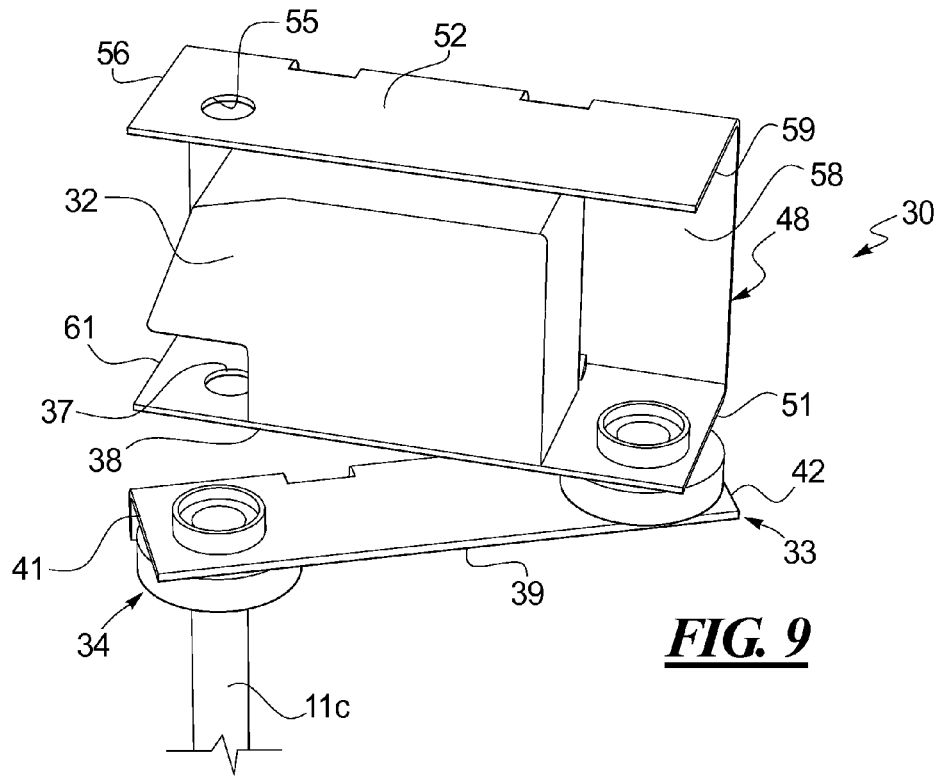
Figure 10:
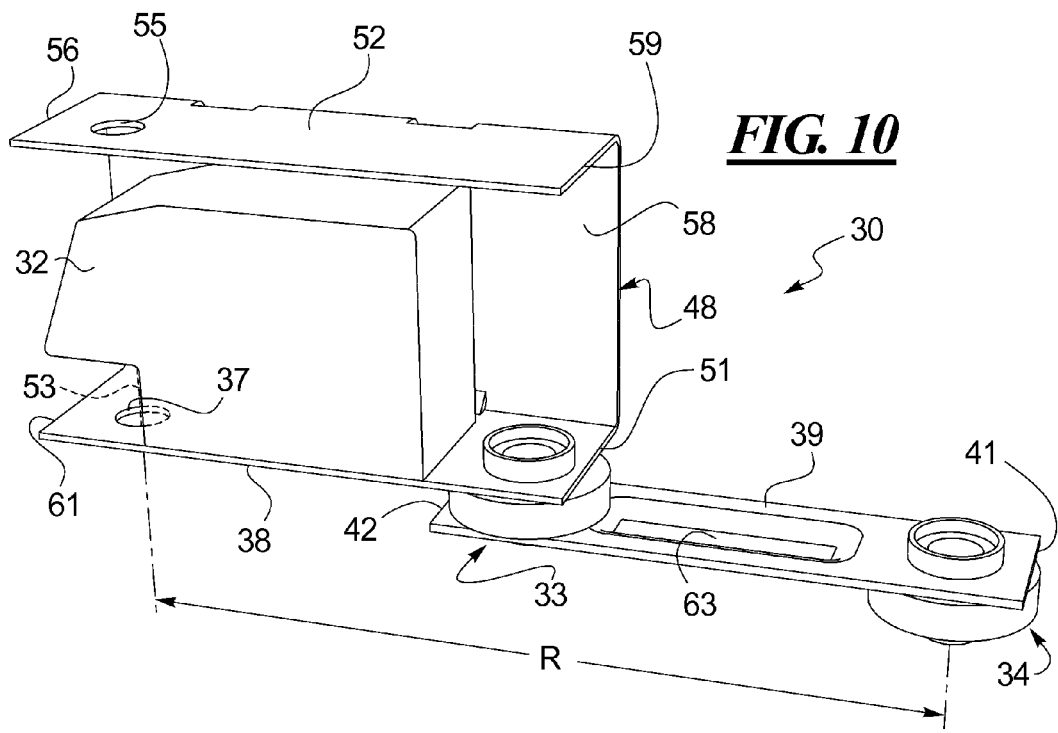
Figure 11:
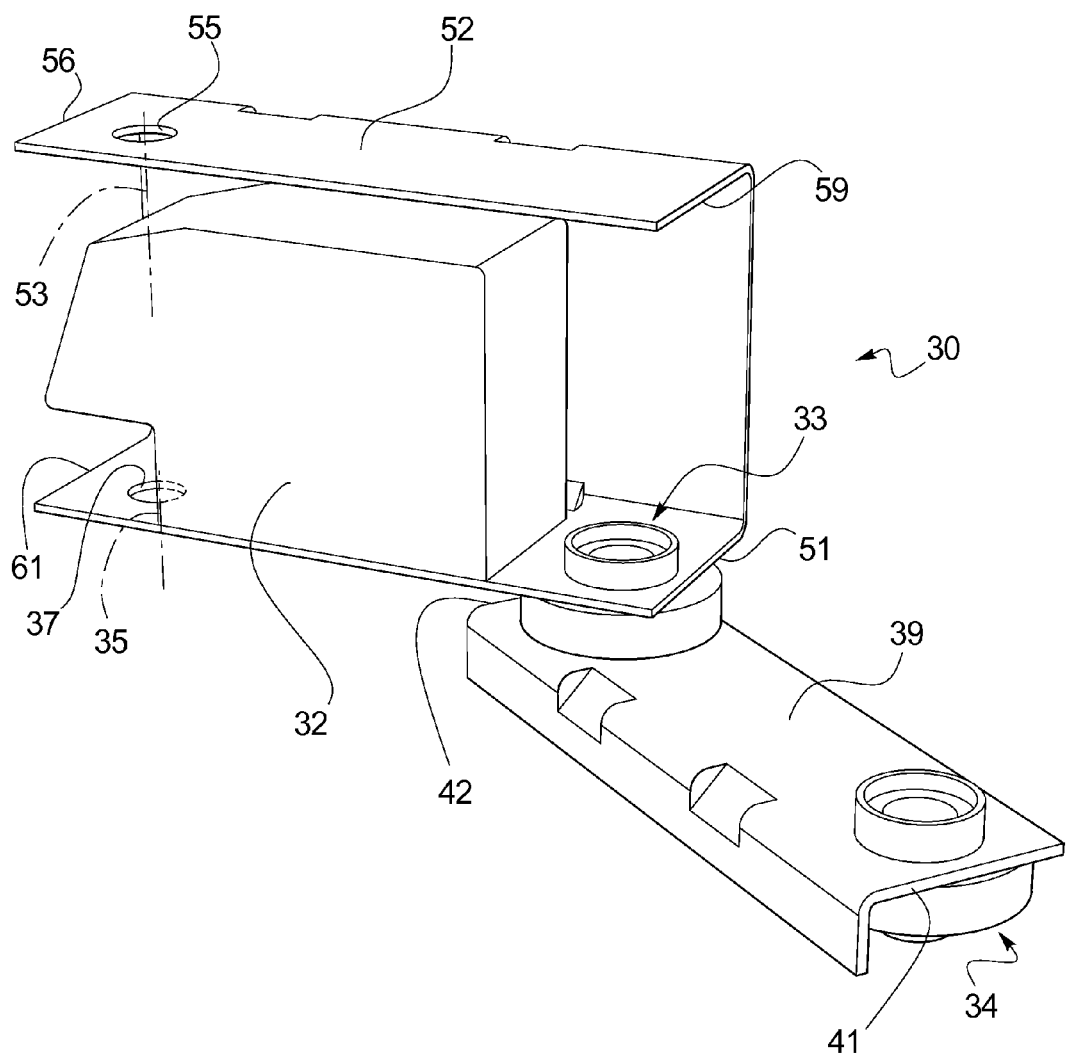

As illustrated in FIGS. 9-11, the dual hinges 33, 34 enable the bracket assembly 30 to assume any position within a radius R extending outward from the rod 11c as defined by the combined length of the arm 39 and portion of the lower wall 38 extending to the opening 37 or axis 53 (see FIG. 10). In the embodiment illustrated in FIG. 10, the arm 39 includes an elongated slot 63 for adjusting the spacing between the hinge connections 33 and 34 and therefore the length of the effective radius R. To enable the light emitter 35 to direct a beam downward to the ground, the lower wall 38 of the bracket 48 includes an opening or open area 37 to permit the passage of light. The opening 37 in the lower wall 38 is coaxial with the opening 55 disposed at the distal end 56 of the upper wall 52 of the c-shaped bracket 48. The opening 55 can be used to mount the shaft 31 and target reflector 13 to the upper wall 52.

Thus, once the correct location of point 36 is found using information from the transit 10a or target receiver 15 and light from the emitter 35 is directed to the ground 22 to the spot to be marked, the operator no longer needs to maintain eye contact with the desired spot on the ground or move the tripod 12b out-of-the-way. Instead, the operator can easily locate the point 36 on the ground 22 by looking for the spot of light emitted by the emitter 35 and the operator can use two hands to drive the stake 21 into the ground 22 at the point 36. Typically, the stake 21 will be placed accurately in the first instance. Then, the entire apparatus can be moved on to the next point for marking. The disclosed bracket assembly and method is faster than the prior art techniques and, can even be employed using a one-man crew.

FIGS. 12-16 illustrate an alternative combination which includes a first arm 139 coupled to a second arm 148 by a shaft 143 that, in the embodiment illustrated in FIGS. 12-16, is a tube. The shaft 133 couples the distal end 142 of the first arm 139 to the proximal end 159 of the second arm 148. The proximal end 141 of the first arm 139 is pivotally coupled to the central rod 11b a bearing shaft 134. The distal end 156 of the second arm 148 is coupled to an adapter 170. The adapter 170 includes a first tubular section 171 and a second tubular section 172. The first tubular section 171 accommodates a light emitter 135. The light emitter 135 is preferably a green laser pointer, a variety of which is available from American Laser Distributing as well as Z-Bolt.com.

Figure 14:
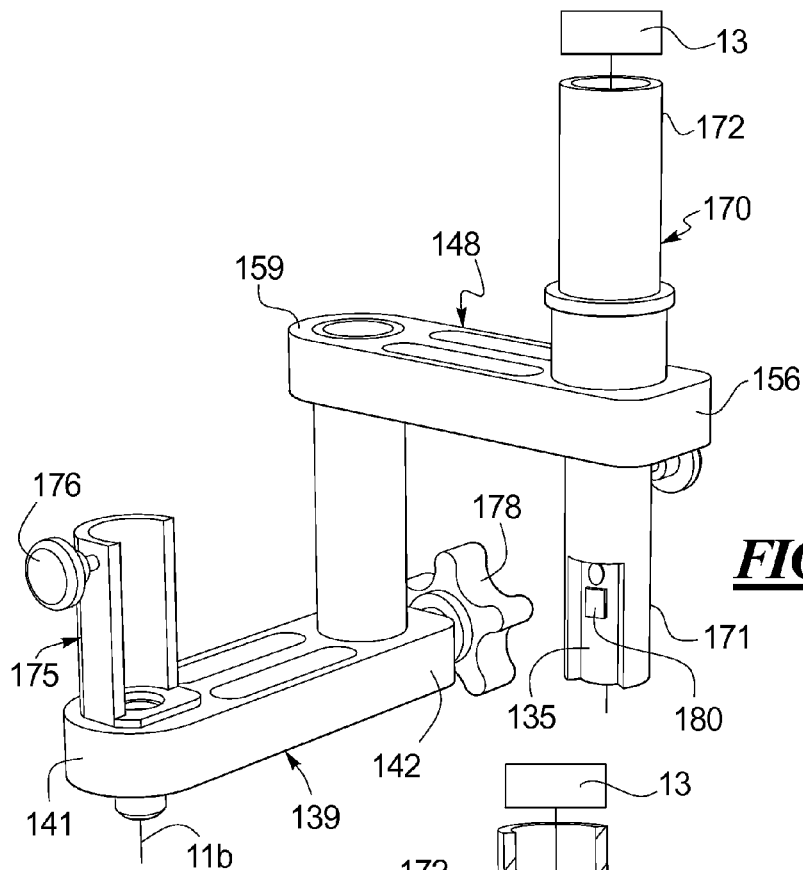

FIGS. 12 and 13 illustrate the combination in a "home" position wherein the first tubular section 171 of the adapter 170 is accommodated in a home clamp 175. The home clamp 175 is coupled to the proximal end 141 of the first arm 139 and includes a threaded clamp member 176 four frictionally holding the first tubular section 171 in place during transport and storage. The first tubular section 171 of the adapter 170 also includes a threaded clamp member 177 for securing the light emitter 135 place. The distal end 142 of the first arm 139 also is coupled to a threaded clamp member 178 for holding the shaft 133 place for purposes of fixing the relationship between the upper and lower arms 139, 148 when the arms 139, 148 are in position to mark a point as illustrated in FIGS. 14 and 16. It will be noted that the embodiment illustrated in FIGS. 12-16 utilizes a light emitting device 135 without plumb bob. Accordingly, the embodiment illustrated in FIGS. 12-16 should be used with a central rod 11b that is equipped with a plumb bob.

INDUSTRIAL APPLICABILITY

The combination target reflector 13, electronic plum bob 32 and bracket assembly 30 can be pivotally connected to a central rod 11 c of an existing target tripod 12b. The bracket assembly 30 includes an arm 39 that includes a proximal end 41 and a distal end 42. The c-shaped bracket 48 includes parallel lower and upper walls 38, 52. The lower wall 38 is spaced apart from and connected to the upper wall 52 by a rear wall 58. The upper and lower walls 38, 52 of the c-shaped bracket 48 each include proximal 51, 59 and distal ends 61, 56. The proximal end 41 of the arm 39 is pivotally connected to the central rod 11c so the arm 39 is perpendicular to the central rod 11c. The distal end 42 of the arm 38 is pivotally connected to the proximal end 51 of the lower wall 38 of the c-shaped bracket 48. The upper and lower walls 38, 52 of the bracket 48 are perpendicular to the central rod 11c and parallel to the arm 39. The distal end 56 of the upper wall 52 of the bracket 48 is perpendicularly connected to the target reflector 13 by way of the target reflector shaft 31. The lower wall 38 of the bracket 48 supports an electronic plum bob 32 that includes a light emitter shown schematically at 35. The light emitter 35 is in axial alignment with the target reflector 38 and an open area 37 in the lower wall 38. As a result, the bracket assembly 30 can be pivoted away from the central rod 11c so that the light emitter 35 can emit a beam downward through the open area 37 of the lower wall 38 of the c-shaped bracket 48 to the ground 22 that is in axial alignment with the target reflector 13.

A disclosed method of marking survey points 36 includes: providing a tripod 12b connected to the combination 30 of as described above; moving the tripod 12b close to the point 36 to be marked; adjusting the tripod 12b until the central rod 11c and target reflector 13 are plumb or vertical using the electronic plumb bob 32; pivoting the bracket assembly 30 so that the open area 37 of the distal end 61 of the lower arm 38, the light emitter 35 and the target reflector 13 are not in axial alignment with the central rod 11c and so that target reflector 13 and light emitter 35 are positioned in axial alignment with the point 36; emitting a light beam from the light emitter 35 and downward though the open area 37 of the lower wall 38 to the point 36; and without moving the tripod 12b, marking the point 36 where the light beam is visible on the ground 22.

In operation, the combination of FIGS. 12-16 begin with a combination in the home position as illustrated in FIGS. 12-13. Specifically, the first and second arms 139, 148 are in alignment with each other so that the adapter 170 is received in the home clamp 175. The clamp member 176 may be tightened to prevent rotation of the adapter 170 away from the home clamp 175 during transport and storage and the prevent actuation of the light emitter 135 by concealing the actuator button 180 when the combination is in the home position as shown in FIGS. 12-13.

To mark a point, the clamp members 176, 178 are loosened so that the arm 148 may be pivoted outward away from the central rod 11 as illustrated in FIGS. 14 and 16. Previously, the central rod 11b has been "plumbed." Once the point is found, the operator may press the actuator button 180 on the light emitter 135 to generate a beam that is directed downward towards the ground. Use of a green laser produces a light spot on the ground that is easily visible, even on bright, sunny days. Other types of lasers and light emitting devices will be apparent to those skilled in the art.

Figure 15:
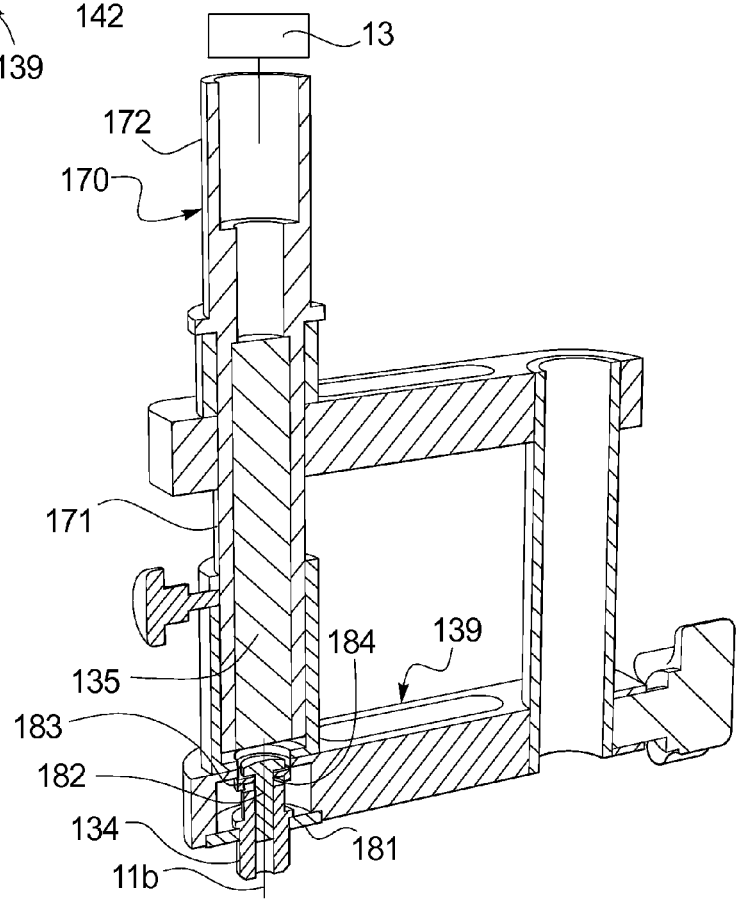
Figure 16:
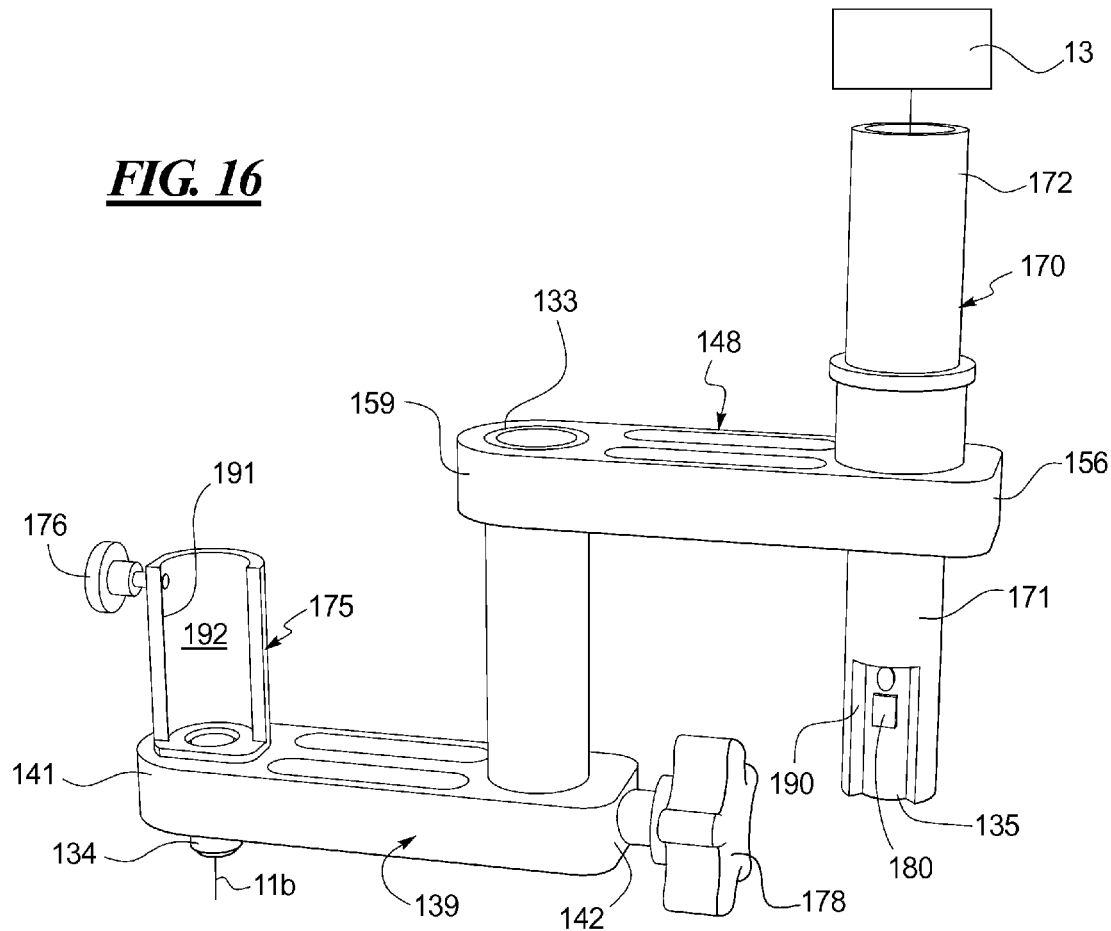

Turning to FIG. 15, the bearing shaft 134 is preferably mateably received in the upper end of the central rod 11b. An annular disk 181 may be used to prevent excess wear on the first arm 139. The bearing shaft 134 is held in place in the proximal end 141 of the first arm 139 by the threaded fastener 182 which rides on a thrust bearing 183 and a washer 184. In a preferred embodiment, the recess 190 in the first tubular section of the adapter 170 is positioned so that it not only exposes the actuator button 180 of the light emitter 135, but also so that the recess 190 is received within the recess 191 in the home clamp 175 so that the actuator button 180 of the light emitter faces the interior wall 192 of the home clamp when the device in the home position as illustrated in FIGS. 12 and 13.

What is claimed is:

1. A combination target reflector, light emitter and bracket assembly for pivotal connection to a central rod of a tripod, the tripod including three legs and the central rod being coupled to top ends of the three legs, the central rod extending vertically upward from the top ends of the three legs, the combination comprising:
a first arm, a second arm, and a light emitter;
the first arm pivotally and perpendicularly coupled to the central rod, the first arm also being pivotally coupled to the second arm so the first and second arms are parallel to each other;
the second arm being coupled to the light emitter so that the light emitter is parallel to the central rod and is positioned to emit a light beam vertically downward; and
the target reflector being coupled to the second arm by an adapter that is coaxial with the light beam.

2. The combination of claim 1 wherein the first arm and the second arm each include proximal and distal ends, the proximal end of the first arm being pivotally and perpendicularly coupled to the central rod, the distal end of the first arm being pivotally coupled to the proximal end of the second arm by a shaft, the distal end of the second arm being coupled to the light emitter.

3. The combination of claim 2 wherein the distal end of the second arm being perpendicularly coupled to the target reflector so the target reflector is in axial alignment with the light emitter.

4. The combination of claim 2 wherein the distal end of the first arm is threadably coupled to a clamp member that engages the shaft that pivotally couples the distal end of the first arm to the proximal end of the second arm to hold the first and second arms in a fixed relationship with respect to each other.

5. The combination of claim 1 wherein the light emitter and target reflector are coupled together and to the second arm by the adapter.

6. The combination of claim 5 wherein the adapter comprises a first tubular section for accommodating the light emitter and a second tubular section for accommodating a shaft that is coupled to the target reflector.

7. The combination of claim 6 wherein the proximal end of the first arm is coupled to a clamp, the clamp comprising a recess for receiving the light emitter and first tubular section of the adapter when the combination is moved to a home position with the distal end of the second arm in alignment with the proximal end of the first arm.

8. The combination of claim 6 wherein the second arm can be pivoted away from the central rod so that the light emitter can emit a light beam through the first tubular section of the adapter to the ground wherein the light beam is in axial alignment with the target reflector.

9. The combination of claim 1 wherein the first arm is coupled to the central rod by a bearing shaft and annular disk disposed between the first arm and the central rod.

10. A combination target reflector, electronic light emitter and bracket assembly for pivotal connection to a central rod of a tripod, the combination comprising:
a first arm including proximal end and distal ends;
a second arm each including proximal and distal ends;
the proximal end of the first arm being pivotally and perpendicularly coupled to the central rod, the distal end of the first arm being pivotally coupled to the proximal end of the second arm so the second arm is perpendicular to the central rod and parallel to the first arm, the distal end of the second arm being perpendicularly coupled to a target reflector and a light emitter that includes a light emitter, the light emitter being in axial alignment with the target reflector;
the distal end of the second arm being coupled to an adapter comprising a first tubular section that accommodates the light emitter and a second tubular section that is coupled to the target reflector;
wherein the second arm can be pivoted away from the central rod so that the light emitter can emit a light beam downward through the first tubular section of the adapter to the ground wherein the light beam is in axial alignment with the target reflector.

11. The combination of claim 10 wherein the first arm and the second arm can be pivoted away from the central rod so that the light emitter can emit a beam downward through the first tubular section of the adapter to the ground that is in axial alignment with the target reflector.

12. The combination of claim 11 wherein the open area of the distal end of the lower wall of the bracket is a hole and wherein the distal end of the upper wall of the bracket includes a hole, through which the target reflector is connected, the holes of the distal ends of the upper and lower walls of the bracket being in axial alignment with each other.

13. The combination of claim 10 wherein the target reflector comprises a shaft that is perpendicularly coupled to the distal end of the upper wall of the second arm.

14. The combination of claim 10 wherein the proximal end of the first arm is coupled to clamp, the clamp comprising a recess for receiving the light emitter and first tubular section of the adapter when the combination is moved to a home position with the distal end of the second arm in alignment with the proximal end of the first arm.

15. The combination of claim 10 wherein the first arm is coupled to the central rod by a bearing shaft and annular disk disposed between the first arm and the central rod.

16. The combination of claim 10 wherein the distal end of the first arm is coupled to the proximal end of the second arm by a shaft, the distal end of the first arm also being threadably coupled to a clamp member that engages the shaft to hold the first and second arms in a fixed relationship with respect to each other.

17. A method of marking a point of a land survey, the method comprising:
providing a tripod coupled to the combination of claim 10;
moving the tripod close to the point;
adjusting the tripod until the central rod and target reflector are plumb using the light emitter;
pivoting the second arm so that the first tubular section of the adapter and the light emitter of the light emitter and the target reflector are not in axial alignment with the central rod and so that target reflector and light emitter are positioned in axial alignment with the point;

emitting a light beam from the light emitter and downward though the first tubular section to the point; and without moving the tripod, marking the point where the light beam is visible on the ground.

18. A method of marking a point of a land survey, the method comprising:

providing a combination target reflector, light emitter and bracket assembly for pivotal connection to a central rod of a tripod, the tripod including three legs and the central rod being coupled to top ends of the three legs, the central rod extending vertically upward from the top ends of the three legs, the combination comprising a first arm, a second arm, and a light emitter, the first arm pivotally and perpendicularly coupled to the central rod, the first arm also being pivotally coupled to the second arm so the first and second arms are parallel to each other; the second arm being coupled to the light emitter so that the light emitter is parallel to the central rod and is positioned to emit a light beam vertically downward, the target reflector being coupled to the second arm by an adapter that is coaxial with the light beam;

moving the tripod close to the point;

adjusting the tripod until the central rod and target reflector are plumb;

pivoting the second arm so that light emitter and the target reflector are not in axial alignment with the central rod and so that target reflector and light emitter are positioned in axial alignment with the point;

emitting a light beam from the light emitter downward to the point; and marking the point.

19. A combination target reflector, light emitter and bracket assembly for pivotal connection to a central rod of a tripod, the combination comprising:

an arm including proximal end and distal ends;

a bracket including parallel lower and upper walls, the lower wall being spaced apart from and connected to the upper wall, the upper and lower walls of the bracket each including proximal and distal ends;

the proximal end of the arm being pivotally connected to the central rod, the arm being perpendicular to the central rod, the distal end of the arm being pivotally connected to the proximal end of the lower wall of the bracket, the upper and lower walls of the bracket being perpendicular to the central rod and parallel to the arm, the distal end of the upper wall of the bracket being perpendicularly connected to the target reflector, the lower wall of the bracket supporting the light emitter, the light emitter being in axial alignment with the target reflector;

the distal end of the lower wall including an open area in axial alignment with the light emitter and the target reflector; and wherein the bracket can be pivoted away from the central rod so that the light emitter can emit a beam downward through the open area of the lower wall of the bracket to the ground that is in axial alignment with the target reflector.

* * * * *